Figure 1:
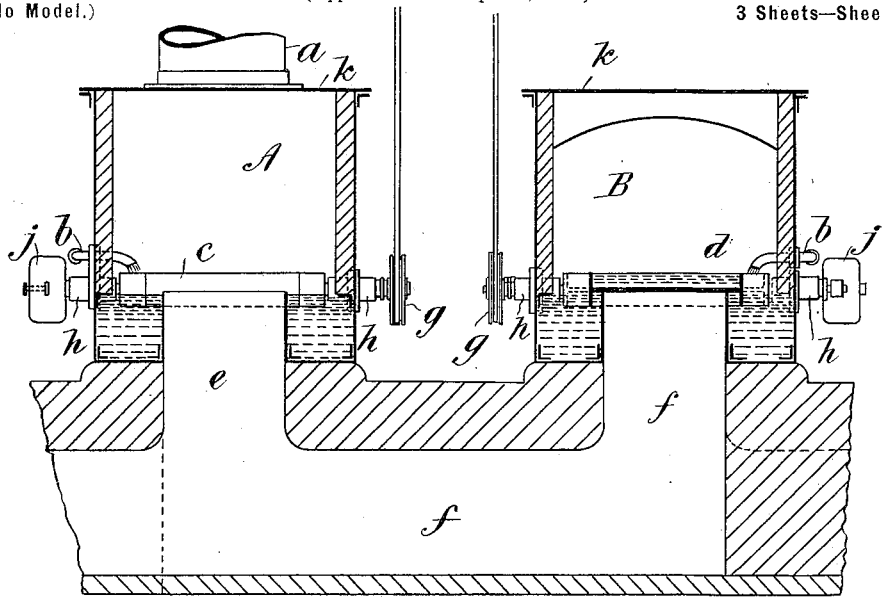

No. 607,035. Patented July 12, 1898.
J. R. HANNAN.
LIQUID SEALED VALVE FOR AIR AND GASES.
(Application filed Sept. 25, 1897.)
(No Model.) 3 Sheets—Sheet 1.

Witnesses
Hugh J. Willoughby
Leonard E. Haynes.

Inventor
John Robert Hannan
per
H. Sefton Jones
Attorney

No. 607,035. Patented July 12, 1898.
J. R. HANNAN.
LIQUID SEALED VALVE FOR AIR AND GASES.
(Application filed Sept. 25, 1897.)
(No Model.) 3 Sheets—Sheet 2.
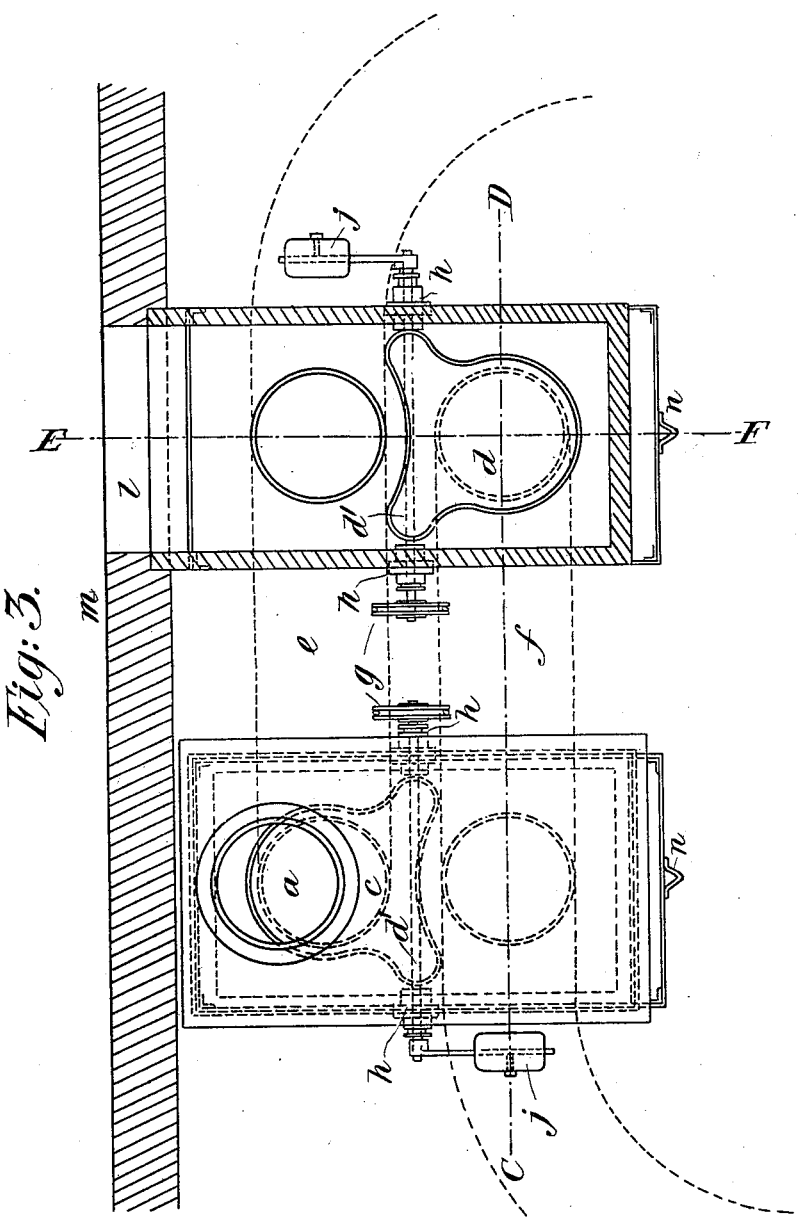

No. 607,035. Patented July 12, 1898.
J. R. HANNAN.
LIQUID SEALED VALVE FOR AIR AND GASES.
(Application filed Sept. 25, 1897.)
(No Model.) 3 Sheets—Sheet 3.
Fig: 5.
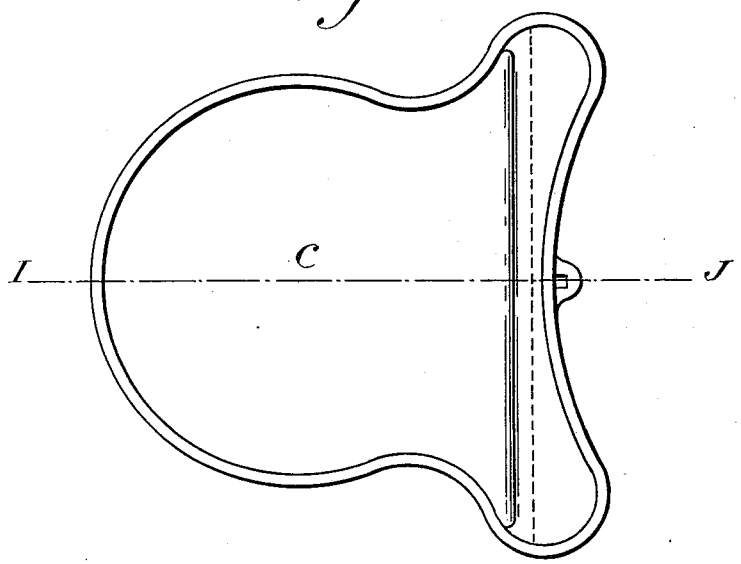
Fig: 4.
Witnesses
Edwin Drew Bartlett
Frank James Ames
Inventor
John Robert Hannan
per Herbert Sefton-Jones
Attorney
THE NORRIS PETERS CO., PHOTO-LITHO., WASHINGTON, D. C.

UNITED STATES PATENT OFFICE.

JOHN ROBERT HANNAN, OF MIDDLESBROUGH, ENGLAND, ASSIGNOR OF TWO-THIRDS TO JOHN HART AND JAMES ARTHUR HART, OF SAME PLACE.

LIQUID-SEALED VALVE FOR AIR AND GASES.

SPECIFICATION forming part of Letters Patent No. 607,035, dated July 12, 1898.

Application filed September 25, 1897. Serial No. 653,055. (No model.)

*To all whom it may concern:*

Be it known that I, JOHN ROBERT HANNAN, engineer, a subject of the Queen of Great Britain, residing at No. 5 Garrett street, Middlesbrough, in the county of York, England, have invented a certain new and useful Improvement in Liquid-Sealed Valves for Air and Gases; and I do hereby declare that the following is a full, clear, and exact description of the same.

My invention relates to liquid-sealed valves for air and gases.

The particular object of my invention is the direction and regulation of the flow of either air or gas, or of both, the prevention of the loss of gas by the sealing of the valves by means of water or other liquid, and the protection of the valves and valve-seats from the effects of heat.

This invention refers specially to regenerative furnaces; but it may be used for any other purpose where applicable.

My improved device consists of two rectangular boxes or casings made of wrought iron or steel plates and angles or of any other suitable material. These boxes or casings are placed side by side, one of said boxes or casings being for receiving the gas through the gas-inlet from the gas-producers. In the said box or casing are two valve-seats, and below are two passages leading to the furnace. Centrally between the two valve-seats is a horizontal spindle, square in section for the greater part of its length, carried in suitable gland-boxes attached to the sides of the box or casing and capable of being revolved therein. Upon the said horizontal spindle is secured a valve which by the revolution of the horizontal spindle closes or opens one or other of the passages for the gas. The ends of the horizontal spindle project through the sides of the box or casing, and upon one end is fitted a suitable counterbalance-weight, and upon the other end suitable gearing is attached for actuating the valve. On the side of the box or casing is a suitable inlet-pipe for admitting water or other liquid for sealing the valve in its seat and also for protecting it and its seat from the effects of heat. The valve, which is of the flap description and made of cast iron or steel or of any other suitable material, has a flange or lip around its edges on both sides at right angles to its main body. The water or other liquid after leaving the inlet-pipe falls upon the upper side of the valve (it will be observed that either side of the valve becomes the upper side in turn) and is therein retained by means of the said flanges or lips till the cavity is full, when it flows over the edges and falls to the bottom of the box or casing, where it is again retained until it reaches a suitable level, so as to seal the valve and its seat, after which it passes off to the waste-pipe by means of a suitable outlet-pipe. The valve is therefore protected from the heat by reason of its being continually covered on its upper side with water or other liquid. The valve has a horizontal slot in the flange on its edge, where it is carried by the horizontal spindle, so that on the withdrawal of the cotters or bolts it may be quickly removed and replaced by another valve when necessary. The second box or casing is for receiving the waste gas from the furnace through the passages below, from whence it passes through whichever valve-seat happens to be open to the chimney-flue. The valve, valve-seatings, counterbalance-weights, gearing for actuating the valve, horizontal spindle, gland-boxes, and pipe for admitting water or other liquid for sealing and protecting the valve are all exactly similar to those in and upon the first box or casing, the only difference between one box or casing and the other box or casing being that the second has no inlet on top and is open at one end to the chimney-flue. Both the boxes or casings may be lined with firebrick or other suitable material.

In order that the invention may be more clearly understood, I have shown in the accompanying drawings one method of carrying out the same in practice.

Figure 2:
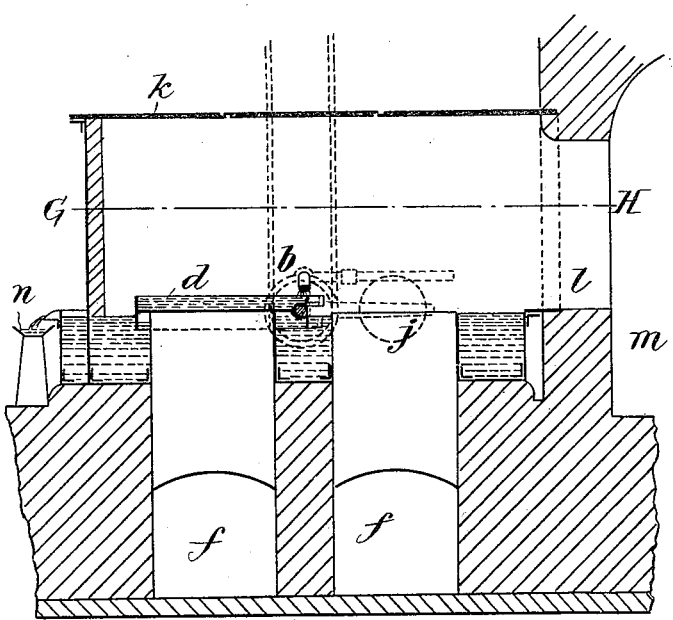

Figure 1 is a sectional elevation of the apparatus on line C D, Fig. 3, showing one passage closed by the valve and the other passage open to receive gas to the furnace. Fig. 2 is a section on line E F, Fig. 3. Fig. 3 is a plan of the device, partly in section. Fig. 4 is a section on line I J, Fig. 5; and Fig. 5 is a plan of the flap-valve.

On the sides of the boxes or casings A and B, Fig. 1, are shown the pipes for admitting water or other liquid for sealing and protecting the valves, valve-seats, the passages, counterbalance-weights, gearing for actuating the valves, and the water or other liquid in position for sealing the valves and their seats.

$a$ is the gas-inlet.

$b\ b$ are pipes for admitting water or other liquid.

$c\ d$ are valves.

$d'\ d'$ are horizontal spindles.

$e\ e$ are passages for the gas to the furnace.

$f\ f$ are passages from the furnace for waste gas to the chimney-flue.

$g\ g$ are gearing for actuating the valves $c$ and $d$.

$h\ h$ are gland-boxes for the horizontal spindles, and $j\ j$ are the counterbalance-weights.

$k\ k$ are covers for the boxes or casings A and B, removable when necessary.

$l\ l$ show the opening to the chimney-flue.

$m$ is the chimney-flue, and $n$ is the spout or trough for conveying away the waste water or other liquid.

The action of the apparatus is as follows: The gas from the gas-producers enters the box or casing A by means of the gas-inlet $a$. It then passes through whichever valve-seat it may be desired and along the passages to the furnace, the other valve-seating being closed by the valve. The waste gas on leaving the furnace passes along the passages from the furnace and up through the required valve-seat into the box or casing B and therefrom to the chimney-flue. When it is desired to reverse the flow of the gas or air and waste gases, the valves $c$ and $d$ are simultaneously revolved, by means of the actuating-gear, from one valve-seat to the other.

What I claim is—

1. In a valve, the combination of a plate provided with upwardly and downwardly extending flanges at its edges and a horizontal slot in one edge, a channel in the valve-seat filled with liquid and adapted to receive said flanges when the valve is closed, a spindle located in the slot in the edge of the valve with means for securing the same therein, bearings for said spindle, and means for rotating the spindle in its bearings so as to open and close the valve, as set forth.

2. In a regenerative furnace, the combination of passages leading toward and away from the heating-chamber, a chamber connecting both passages with the gas-inlet, a second chamber connecting both passages with the chimney-outlet, valve-seats at the entrance of said passages in both chambers, channels in said valve-seats, a flanged plate horizontally pivoted between the valve-seats in each chamber, the upstanding flange of which forms a receptacle for liquid on the top of the plate, the lower flange being received in the channel in the valve-seat, and means for rotating said plate to close one or other of the passages as desired, as set forth.

3. In a regenerative furnace, the combination of passages leading toward and away from the heating-chamber, a chamber connecting both passages with the gas-inlet, a second chamber connecting both passages with the chimney-outlet, valve-seats at the entrance of said passages in both chambers, channels in said valve-seats, a flanged plate horizontally pivoted between the valve-seats in each chamber, the upstanding flange of which forms a receptacle for liquid on the top of the plate, the lower flange being received in the channel in the valve-seat, means for causing liquid to circulate through the receptacles on the tops of each plate and through the channels in the valve-seats, and means for rotating the plates to close one or other of said passages as desired, as set forth.

In testimony whereof I have signed my name to this specification in the presence of two subscribing witnesses.

JOHN ROBERT HANNAN.

Witnesses:
  T. D. H. STUBBS,
  ALFRED TEASDALE.